United States Patent Office 3,062,851
Patented Nov. 6, 1962

3,062,851
METHOD OF PREPARING DIBASIC ACIDS FROM CYCLOHEXANONE AND ACRYLONITRILE AND PRODUCTS OBTAINED
Giam Paolo Chiusoli, Novara, and Francesco Minisci and Adolfo Quilico, Milan, Italy, assignors to Montecatini Societa Generale per l'Industria Mineraria e Chimica, Milan, Italy, a corporation of Italy
No Drawing. Filed May 13, 1957, Ser. No. 658,542
Claims priority, application Italy May 15, 1956
13 Claims. (Cl. 260—404)

This invention relates to the preparation of dibasic, particularly γ-hydroxy-azelaic acid and the lactone thereof from cyclohexanone and acrylonitrile.

The starting material consists of cyclohexanone and acrylonitrile. It is known that cyclohexanone (I) can be cyanethylated in the α-position with one single molecule of acrylonitrile (II). The resulting cyclohexanone-propionitrile (III) can be hydrolyzed to cyclohexanone-alpha-propionic acid (IV)

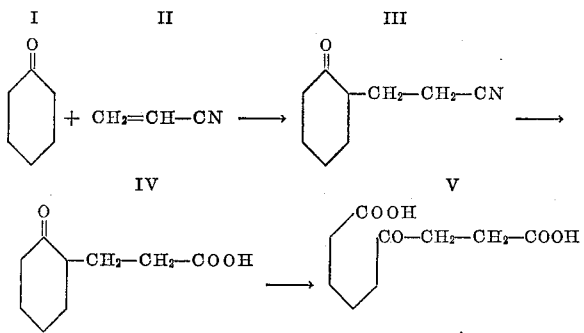

Until now, γ-keto-azelaic acid (V) was obtained only upon ozonization of cyclohexanone-propionic acid.

We have now discovered that the oxidation of the cyclohexanone-propionic acid (IV) to γ-keto-azelaic acid (V) can be carried out with air or oxygen-nitrogen mixtures, with or without catalysts and solvents and at normal or increased pressure.

We also found that treating cyclohexanone-propionic acid (IV) with hydrogen peroxide causes the formation of a peroxide which can be reduced to γ-keto-azelaic acid by means of acids or alkalies.

Moreover, we found that cyclohexanone-propionitrile (III) also can be oxidized with air, resulting in the formation of 6-keto-9-cyan-nonanoic acid (VIII) (semicarbazone, M.P. 180° C.), from which keto-azelaic acid (V) is obtained by means of hydrolysis,

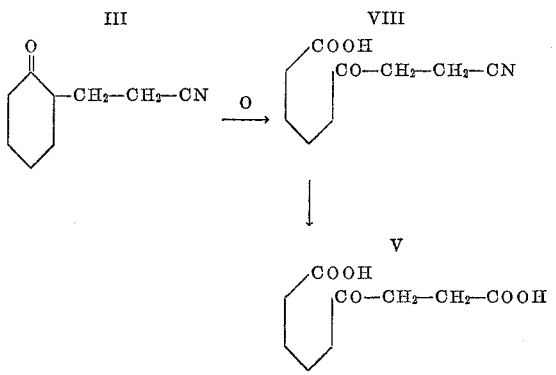

Furthermore, we found that, if keto-azelaic acid is reduced with hydrogen at a pressure of 20 to 200 atm., in the presence of a hydrogenation catalyst and at a temperature of 70 to 200° C., oxy-azelaic acid is obtained in form of the lactone (VI) and, if the reduction is continued at a temperature of 200 to 300° C., azelaic acid (VII) is obtained. (Keto-azelaic acid must be first reduced to oxy-azelaic acid in order to prevent intramolecular condensation of the carbonyl group),

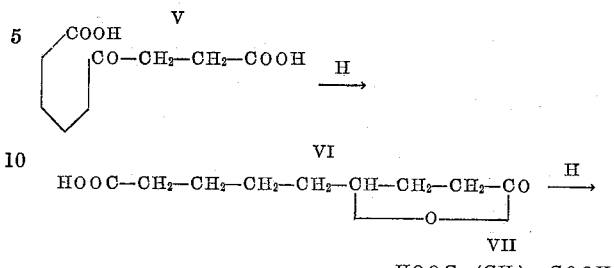

The lactone, heretofore unknown, is a solid, white material; M.P. 52° C., which is soluble in chloroform and scarcely soluble in water and ether.

γ-Keto-azelaic acid as well as γ-hydroxy-azelaic acid were found to be useful as monomers for polymerizations and co-polymerizations, particularly in preparing polyamides, to obtain materials of hydrophilic character.

It is, therefore, the principal object of the present invention to provide new and simple processes to prepare γ-keto-azelaic acid and γ-hydroxy-azelaic acid (or γ-oxy-azelaic acid) from cyclohexanone-propionic acid or cyclohexanone-propionitrile.

It is a further object of the invention to provide γ-keto-azelaic acid and γ-hydroxy-azelaic acid as polymerizable and co-polymerizable monomers.

These and other objects and advantages of the invention will appear more clearly from the herein following specific examples and from the appended claims.

Example 1

1 kg. of cyclohexanone-propionic acid, obtained by means of cyano-ethylation of cyclohexanone, is dissolved in 4 kg. of water and oxidized for 6 hours in the presence of an organic cobalt salt in an autoclave at 100° C. and at an air pressure of 100 atm. 0.4 kg. of keto-azelaic acid are obtained and 0.25 kg. of the starting acid are recovered.

Example 2

1 kg. of cyclohexanone-propionitrile is oxidized with air in an autoclave at 100° C. and 90 atm. pressure in the presence of 1 l. water and of an organic cobalt salt. Oxidation is continued until 40% starting material has been converted. 0.25 kg. of 6-keto-9-cyan-nonanoic acid are obtained. The product is then hydrolyzed to keto-azelaic acid.

Example 3

1 kg. of cyclohexanone-propionic acid in alkaline solution is oxidized at a temperatrue lower than 30° C., with 120 volumes of hydrogen peroxide. Upon acidification and decomposition with 50%-sulfuric acid, 1 kg. of γ-keto-azelaic acid is obtained.

Example 4

1 kg. of γ-keto-azelaic acid in dilute alkaline solution is reduced at 130° C. with Raney nickel under a hydrogen pressure of 100 atmospheres. 0.90 kg. of the lactone of γ-oxy-azelaic acid are obtained.

Example 5

1 kg. of keto-azelaic acid in alkaline solution, as indicated in the preceding example, is reduced to oxy-azelaic acid and subsequently transformed into azelaic acid at 270° C. and 220 atm. 0.15 kg. of azelaic acid and 0.7 kg. of oxy-azelaic lactone are obtained after 8 hours of operation.

Example 6

Equimolecular amounts of the lactone of γ-oxy-azelaic acid and hexamethylene diamine are dissolved in chloroform and mixed with each other. A salt (M.P. 179° C.) crystallizes which is dissolved in water and heated to 200° C. in an autoclave. The temperature is raised gradually and the pressure is kept constant by venting. After ¼ hour at 250° C., the pressure is released over a period of 1 hour. The mixture is then kept at 250° C. for another hour. A glassy polymer is obtained.

We claim:

1. The process of preparing γ-keto-azelaic acid comprising treating cyclohexanone-alpha-propionic acid with a member of the group consisting of oxygen and oxygen-nitrogen mixtures at a temperature ranging from 80 to 120° C. and an oxygen partial pressure of 5 to 25 atmospheres.

2. The process according to claim 1, wherein said treatment is carried out in the presence of a solvent.

3. The process according to claim 1, wherein said cyclohexanone is dissolved in water.

4. The process according to claim 1, wherein said treatment is carried out in the presence of an oxidation catalyst.

5. The process of preparing γ-keto-azelaic acid comprising treating an alkaline solution of cyclohexanone-alpha-propionic acid at a temperature of less than 30° C. with hydrogen peroxide, and reducing the resulting peroxide by treating with 50% sulfuric acid.

6. A process of preparing gamma-keto-azelaic acid comprising treating alpha-cyclohexanone-propionitrile with an oxygenous gas at a temperature ranging from 80 to 120° C., at an oxygen partial pressure of about 5 to 25 atmospheres, and hydrolyzing the resulting 6-keto-9-cyano-nonanoic acid to gamma-keto-azelaic acid.

7. A process of making 6-keto-9-cyano-nonanoic acid comprising heating cyclohexanone-alpha-propionitrile with an oxygen containing gas under superatmospheric pressure.

8. A process of preparing gamma-keto-azelaic acid comprising treating an alkaline solution of cyclohexanone-alpha-propionic acid at a temperature below 30° C. with hydrogen peroxide, and reducing the resulting peroxide.

9. A process of preparing gamma-keto-azelaic acid comprising treating alpha-cyclohexanone-propionitrile in water with molecular oxygen at a temperature ranging from about 80° to about 120° C. at superatmospheric pressure in the presence of an organic cobalt salt and drolyzing the resulting 6-keto-9-cyano-nonanoic acid to gamma-keto-azelaic acid.

10. A process of preparing gamma-keto-azelaic acid comprising treating alpha-cyclohexanone-propionic acid with molecular oxygen in water in the presence of an organic cobalt catalyst at a temperature ranging from 80° to 120° C. and an oxygen partial pressure of 5 to 25 atmospheres.

11. A process of preparing gamma-keto-azelaic acid comprising treating alpha-cyclohexanone-propionic acid with molecular oxygen in water in the presence of an organic cobalt catalyst at a temperature ranging from 80° to 120° C. at superatmospheric pressure.

12. A process of preparing gamma-keto-azelaic acid comprising treating alpha-cyclohexanone-propionic acid with molecular oxygen in water at a temperature ranging from 80° to 120° C. at superatmospheric pressure.

13. A process of preparing gamma-keto-azelaic acid comprising heating alpha-cyclohexanone-propionic acid with molecular oxygen in water under superatmospheric pressure.

References Cited in the file of this patent

UNITED STATES PATENTS

| | | |
|---|---|---|
| 2,286,559 | McAllister | June 16, 1942 |
| 2,368,366 | Kyrides et al. | Jan. 30, 1945 |
| 2,499,797 | Theobald | Mar. 3, 1950 |
| 2,532,048 | Warner et al. | Nov. 28, 1950 |
| 2,617,835 | Curtin | Nov. 11, 1952 |
| 2,849,457 | Holmquist | Aug. 26, 1958 |

OTHER REFERENCES

Huckel et al.: I—Liebig's Annalen 441, 21–34 (1925).
Stoll et al.: Helv. Chim. Acta 13, 142–153 (1930).
Huckel et al.: II—Liebig's Annalen 502, 146–7 (1933).
Salkind: Chemishes Zentralblatt, p. 1269, Part II (1914).
Mannich: Berichte, 74, p. 564 (1941).
Pechmann: Berichte, 37, p. 3820 and 21 (1904).
Leuchs et al.: Berichte, 55, p. 3958 (1922).